United States Patent [19]

Hosaka et al.

[11] Patent Number: 5,119,203

[45] Date of Patent: Jun. 2, 1992

[54] MONITOR MOUNTING FIXTURE

[75] Inventors: Akihiko Hosaka, Tokyo; Yoshiaki Honjo, Higashiyamato, both of Japan

[73] Assignee: Casio Computer Co., Ltd., Tokyo, Japan

[21] Appl. No.: 307,364

[22] Filed: Feb. 6, 1989

[30] Foreign Application Priority Data

Feb. 16, 1988 [JP] Japan .............................. 63-18813[U]

[51] Int. Cl.⁵ .............................................. H04N 5/30
[52] U.S. Cl. .................... 358/229; 358/224; 358/249; 354/81; 248/183; 248/179
[58] Field of Search ............... 358/224, 229, 254, 248, 358/249; 354/81; 248/183, 187, 179

[56] References Cited

U.S. PATENT DOCUMENTS 3,072,738  1/1963  Epps. Jr. et al. .................... 358/249
4,625,731  12/1986 Quedens et al. .................... 358/249
4,682,240  7/1987  Bachmann .......................... 358/224

FOREIGN PATENT DOCUMENTS 60-32862  3/1985  Japan .
61-103968 7/1986  Japan .

Primary Examiner—James L. Dwyer
Assistant Examiner—M. Shehata
Attorney, Agent, or Firm—Frishauf, Holtz, Goodman & Woodward

[57] ABSTRACT

A monitor mounting fixture includes a base member detachably mounted on an image pickup machine. A monitor supporting arm is supported on the base member such that it can be rotated in its peripheral direction. The monitor supporting arm has a portion bendable along an axial direction. A monitor mounting unit is mounted on the monitor supporting arm. The monitor mounting unit can detachably be mounted on a monitor display.

28 Claims, 4 Drawing Sheets

/ 1

MONITOR MOUNTING FIXTURE

BACKGROUND OF THE INVENTION

1. Field of the Invention

The present invention relates to an improvement in an image pickup machine, such as a video camera.

2. Description of the Related Art

In order to allow to pick up an image while viewing the screen of a monitor display, a monitor display is mounted to an image pickup machine, such as a video camera, as in the conventional example. For example, in FIG. 1, a shoe engaging member 2 which is fixed to the lower surface of a monitor display 1 is brought into engagement with the top surface of an image pickup machine A, such as a handy type video camera. An output terminal 4 of the image pickup machine A is connected by a cable 6 to input terminal 5 of the monitor display 1 to display a video image on the display 1.

In the conventional example, the monitor display 1 is fixed to the image pickup machine with a viewing screen 1a oriented on the side of a viewfinder a of the image pickup machine A. If, however, an image is to be taken with the image pickup machine A located upwardly or downwardly relative to the eye level of an operator, it will be necessary for he or she to view the viewing screen in a slanting direction. It is, therefore, difficult to see the viewing screen of the monitor display 1.

In order to make the monitor display of the handy type image pickup machine lighter in weight, it is desirable to employ a liquid crystal display panel for image display. However, a twisted nematic type display panel currently being employed extensively has a given angle of visibility, making it sometimes difficult to view.

SUMMARY OF THE INVENTION

It is accordingly an object of the present invention to provide an improved monitor mounting fixture which can orient a monitor's viewing screen in any desirable direction relative to an image pickup machine, such as a video camera, upon the taking of an image by the image pickup machine in any direction. A monitor mounting fixture for mounting a monitor on an image pickup machine comprises a base member detachably mounted on the image pickup machine, a monitor support arm whose one end portion is so supported by the base plate as to be rotatable in its peripheral direction, and a monitor mounting unit mounted on the other end portion of the monitor support arm for detachably mounting a monitor display thereon.

In the monitor mounting fixture of the present invention, a monitor display which is mounted on the monitor mounting unit of the monitor support arm can be rotated in the peripheral direction of the monitor support arm and hence the posture of the monitor display attached to the image pickup machine can be controlled in any desired direction. It is, therefore, possible to orient the viewing screen of the monitor display in an easy-to-see direction when an image is taken, in any practical direction, on the image pickup machine.

BRIEF DESCRIPTION OF THE DRAWINGS

FIG. 2 being a perspective view showing a monitor mounting fixture whereby a monitor display, such as a liquid crystal TV receiver, is attached to an image pickup machine, FIG. 3 being a perspective view showing a state in which the liquid crystal TV receiver is mounted on the image pickup machine, and FIG. 4 being a perspective view showing the liquid crystal TV receiver and image pickup machine in a compactly assembled state.

DETAILED DESCRIPTION OF THE PREFERRED EMBODIMENTS

A monitor mounting fixture according to one embodiment of the present invention will be explained below in more detail with reference to FIGS. 2 to 4.

Figure 1:
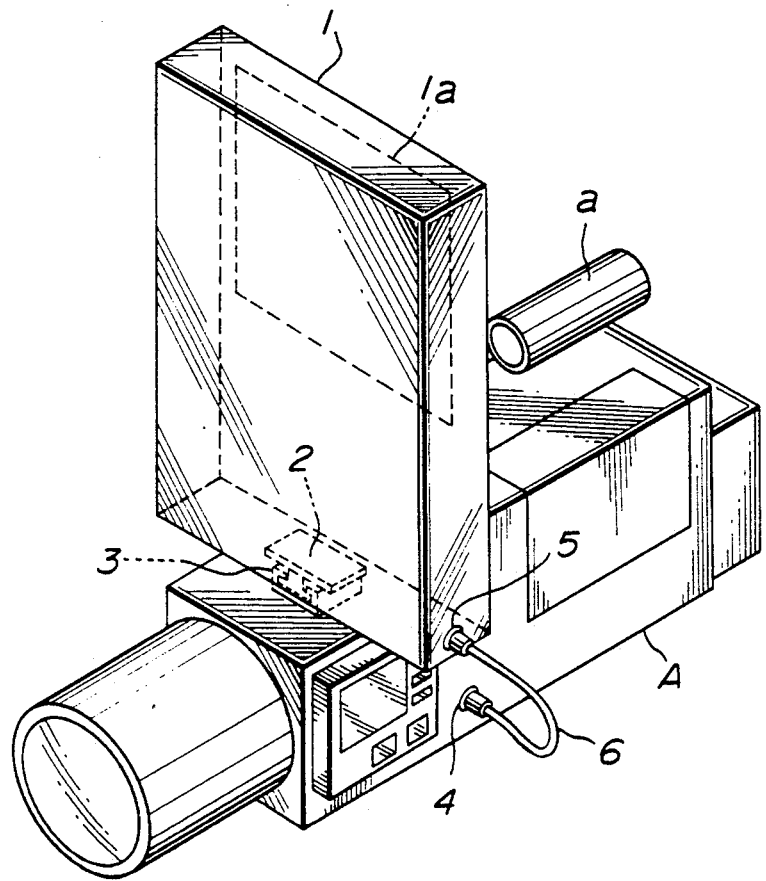
FIG. 1 is a perspective view showing a conventional image pickup machine with a monitor attached thereto.
Figure 2:
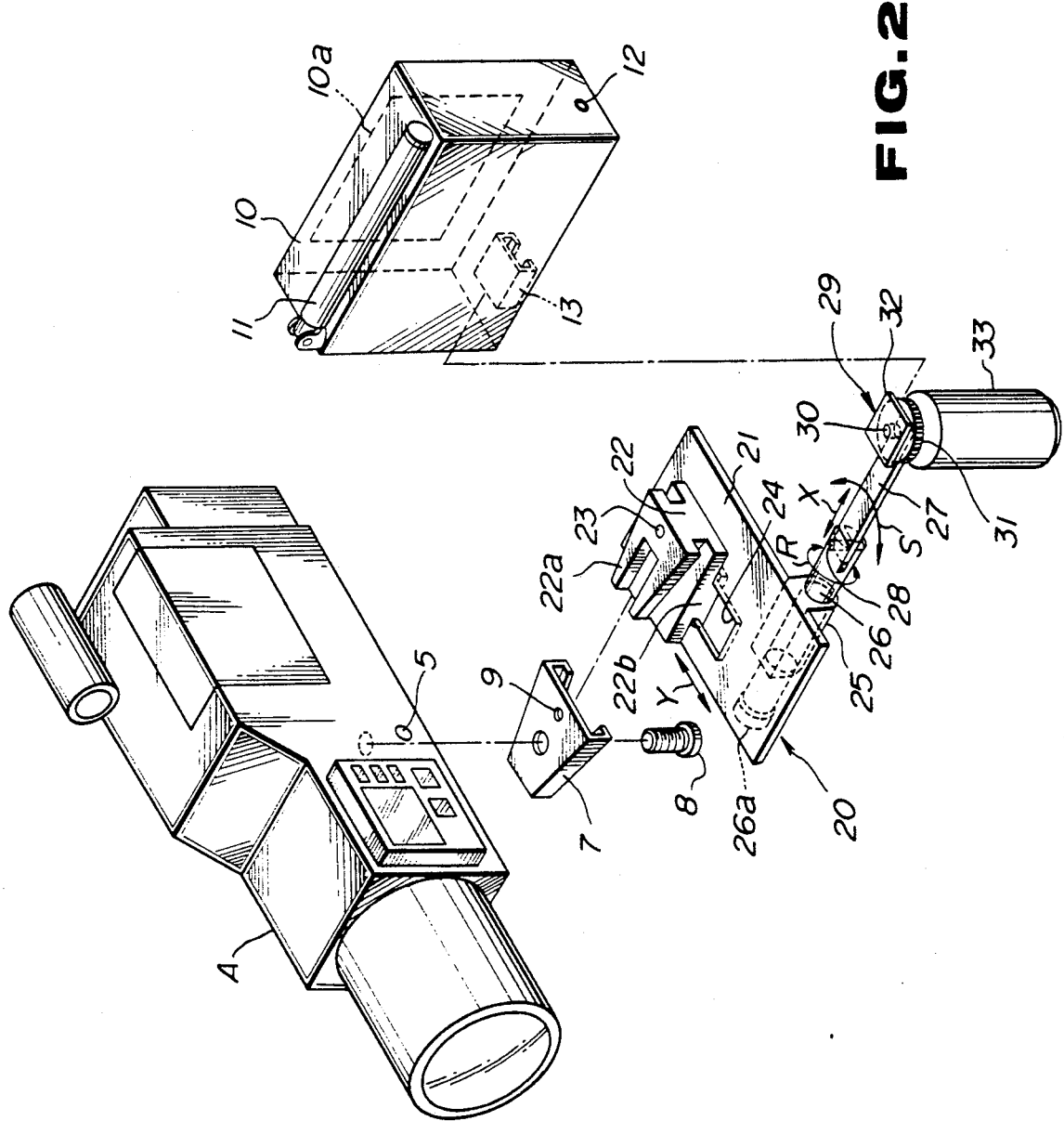
FIGS. 2 to 4 show a monitor mounting fixture according to an embodiment of the present invention.
Figure 3:
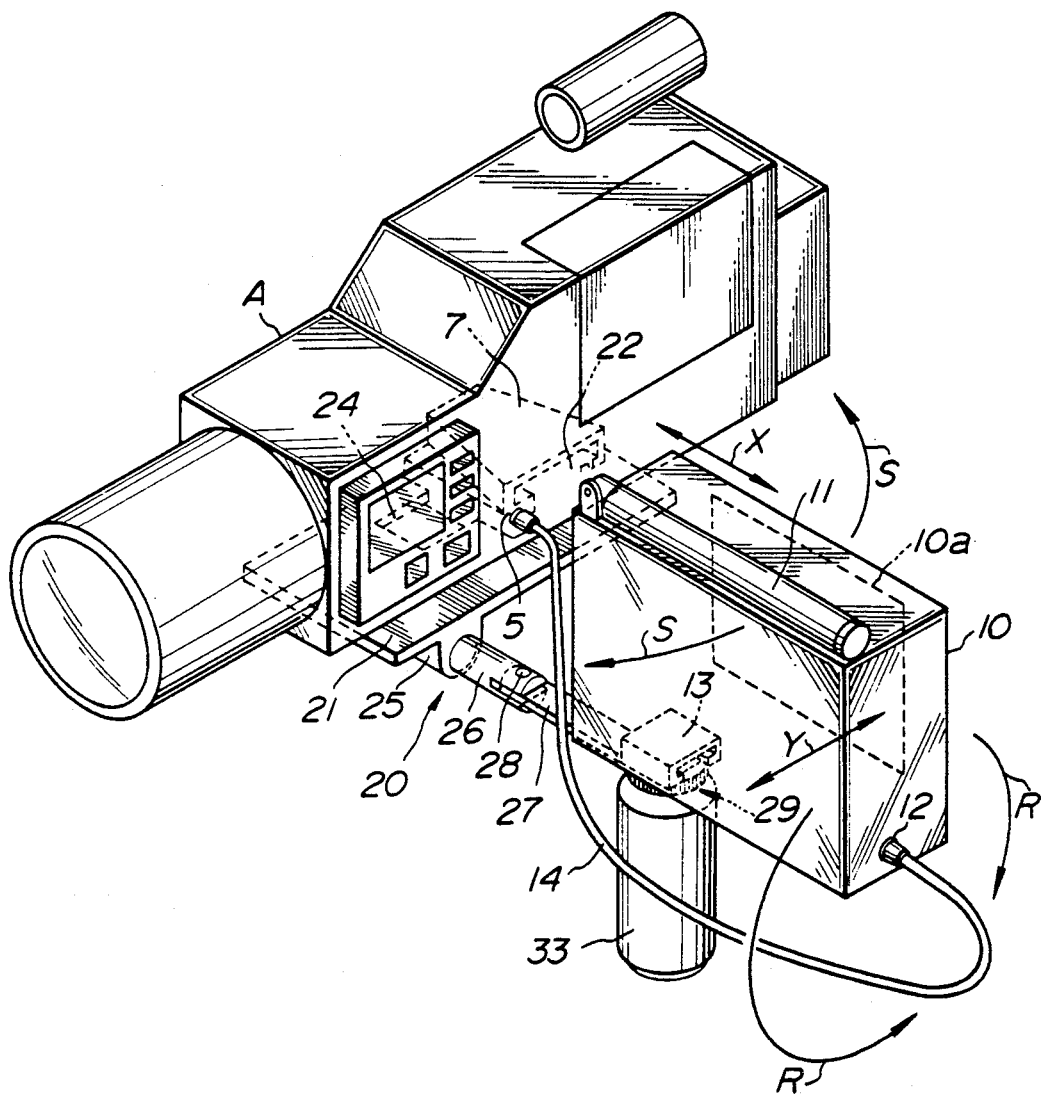
Figure 4:
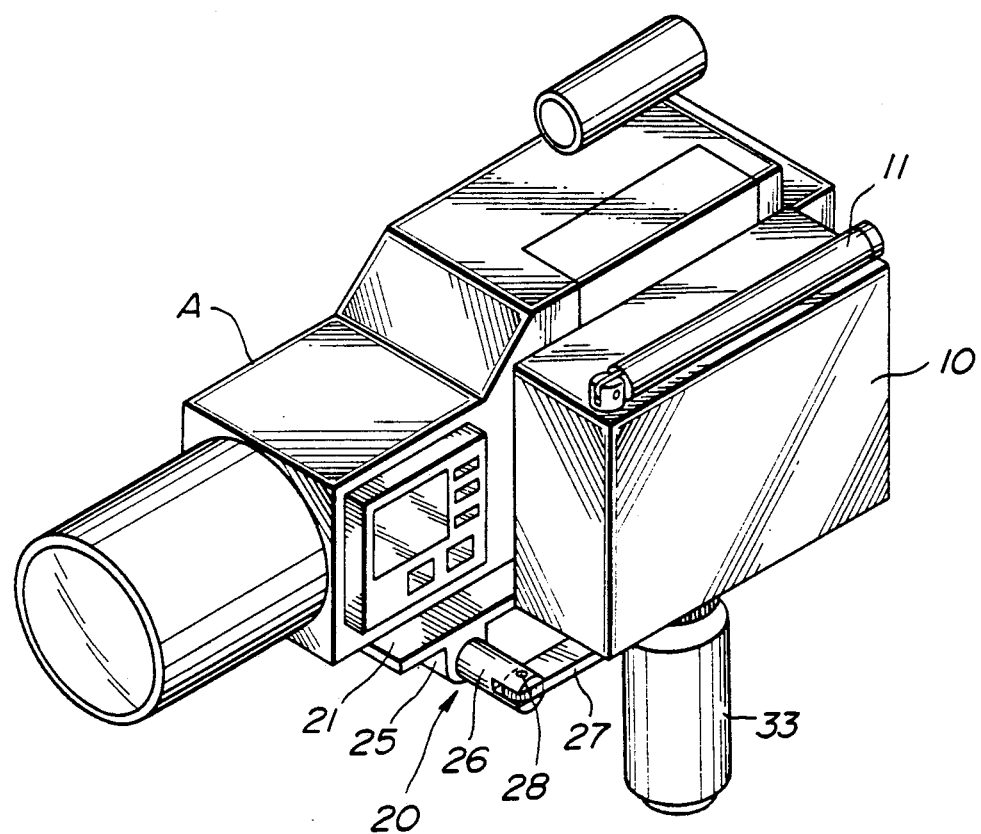

In FIGS. 2 to 4, A shows an image pickup machine, such as a handy type video camera, and reference numeral 10 shows a compact liquid crystal TV receiver. The liquid crystal TV receiver 10 includes a TN (twisted nematic) type dot matrix liquid crystal display panel, back light, tuner, receiver circuit, speaker, display drive circuit, power supply battery, and so on, all of which are housed within a receiver casing. An expansible rod antenna 11 is attached to the top surface of the receiver casing and an input terminal 12 for a video signal is provided in the side face of the casing. Reference numeral 10a shows a viewing screen on the liquid crystal TV receiver 10. The compact liquid crystal TV receiver 10 is usually used as a TV receiver. When TV receiver 10 is used as a monitor display for the image pickup machine A, it is mounted by a monitor mounting fixture 20 to the image pickup machine A.

The arrangement of the monitor mounting fixture 20 will now be explained below.

In the arrangement shown in FIG. 2, shoe 7 is mounted on the lower surface of the image pickup machine A. A shoe engaging member 22 is mounted on the upper surface of the base plate 21. The base plate 21 is detachably mounted on the lower surface of the image pickup machine A such that the shoe engaging member 22 is inserted into engagement with a shoe 7. The shoe 7 is so configured that the width becomes narrower in a direction in which the shoe engaging member 22 is inserted. The shoe 7 is secured by a screw 8 to the surface of the image pickup machine A with the insertion opening of the shoe engaging member oriented toward one side face of the image pickup machine A. A convergent shoe engaging portion 22a is formed on the shoe engaging member 22 so that it is snugly fitted into the shoe 7. On the base end portion of the shoe engaging portion 22a a ball 23 is provided which is adapted to be snap-fitted into a lock hole 9 provided in the shoe 7. The ball 23 is so urged by a spring, not shown, provided within the shoe engaging member 22, that it can be popped up. When the shoe engaging portion 22a is inserted into and out of the shoe 7, the ball 23 is pressed down by the lower surface of the shoe 7.

A guide opening 24 is formed in the base plate 21 and extends in a Y direction, that is, in the front/back direction of the image pickup machine A. The shoe engaging member 22 has a foot portion 22b mounted at its lower surface to allow it to be slidably movable along a guide hole 24 and hence be movable, in the front/back direction, relative to the base plate 21. The shoe engaging member 22 is so mounted on the base plate 21 that it is not moved unwarrantedly unless being given a force exceeding a certain value by their mutual friction force.

A cylindrical bearing section 25 is provided on the lower surface of the base plate 21 in an X direction, that is, in the width direction of the image pickup machine A. An axial member 26 formed of a round bar is so telescopically inserted into the cylindrical bearing section as to not only be rotatable in a peripheral direction but also be movable in the axial direction, that is, in the X direction. The axial member 26 is so supported in the bearing section 25 that it is neither rotated in the peripheral direction nor moved in the axial direction, unwarrantedly, due to their sliding contact under a proper friction force, unless being given a force exceeding a certain value. A stopper 26a is provided at the rear end of the shaft member 26, preventing the shaft member 26 from being slipped off the base plate.

A groove is provided on the forward end of the shaft member 26 and a monitor support arm 27 has its base end portion fitted into the groove of the shaft member 26. A support shaft 28 penetrates both the base end portion of the support arm and shaft member 26 in a direction perpendicular to the axis of the shaft member 26 and the groove. Therefore, the support arm 27 is rotatable by the support shaft 28 in a direction perpendicular to the peripheral direction of the shaft member 26. The support arm 27 is supported on the shaft member 26 against an unauthorized rotation unless being given a force exceeding a certain value, because the base end portion of the support arm 27 is slidably fitted into the groove of the shaft member 26 under a proper friction force. A monitor mounting unit 29 is mounted at the forward end of the monitor support arm 27, and comprises a threaded shaft 30 fixed to the forward end portion of the support arm 27 and extending through the monitor support arm 27, a rotation knob 31 threaded by means of the threaded shaft 30 to fix the monitor and shoe engaging plate 32 in place which is attached to the upper end of the threaded shaft. The monitor mounting unit 29 is inserted into a shoe 13 for mounting, which in turn is fixed to the lower surface of the liquid crystal TV receiver 10 by means of, for example, a fastening member. The liquid crystal TV receiver 10 is detachably fixed to the monitor mounting unit 29 by turning the rotation knob 31 and fastening the shoe 13 from under. The liquid crystal TV receiver 10, which is attached to the monitor mounting unit 29, provides a structure integral with the monitor support arm 27. A grip 33 is mounted on the forward end portion of the monitor support arm 27 on the side opposite to that on which the monitor mounting unit 29 is located.

The monitor mounting fixture 20 is mounted on the image pickup machine A as shown in FIG. 3 by attaching the base plate 21 to the lower surface of the image pickup machine A with the shoe engaging member 22 fitted into the shoe 7 on the lower surface of the image pickup machine and attaching the liquid crystal TV receiver 10 to the monitor mounting unit 29. The liquid crystal TV receiver 10 which is mounted on the monitor mounting fixture 20 is used as a monitor display by connecting the video signal input terminal 12 to the video signal output terminal 5 via the cable 14.

The monitor support arm 27, together with the shaft member 26, can be rotated in the periphery direction of the shaft member 26 and in the direction perpendicular to the peripheral direction of the shaft member 26 with the support shaft 28 as a center. The liquid crystal TV receiver 10 which is mounted on the monitor mounting unit 29 of the monitor support arm 27 can be rotated in two directions, that is, in the peripheral direction R of the shaft member 26 and in the direction S (the rotation direction of the monitor support arm 27) perpendicular to the peripheral direction R. When, therefore, the liquid crystal TV receiver 10 is attached by the monitor mounting fixture 20 to the image pickup machine A, then the so-mounted liquid crystal TV receiver 10 can controllably be oriented in any desired direction. Hence the display screen 10a of the liquid crystal TV receiver 10 can be oriented in an easy-to-see direction even when the image pickup machine 10 takes any practical position. The practical posture of the so-controlled liquid crystal TV receiver 10 is not changed by, for example, a vibration because the shaft member 26 is fixed to the bearing section 25 and the monitor support arm 27 is fixed to the shaft member 26 under the friction forces. Since the shaft member 26 is so supported in the bearing section 25 as to be movable in the axial direction, the liquid crystal TV receiver 10 can controllably be moved in the axial direction of the shaft member 26, that is, in the width direction X of the image pickup machine A. Furthermore, the shoe engaging member 22 is movably attached to the base plate 21 so that the base plate 21 can be moved in the front/back direction of the image pickup machine A. It is also possible to controllably move the liquid crystal TV receiver 10 in the front-/back direction of the image pickup machine A. Since the grip 33 is mounted on the monitor support arm 27 of the monitor mounting fixture 20, the image pickup machine A can be held by both hands of an operator with the image pickup machine A held by one hand and the grip 33 held by the other hand of the operator. The posture of the liquid crystal TV receiver 10 can readily be controlled utilizing the grip 33. The liquid crystal TV receiver 10 can be set as a compact unit as shown in FIG. 4 by turning the liquid crystal TV receiver 10 and monitor support arm 27 toward the image pickup machine A. Therefore, the operator can carry the image pickup machine A and liquid crystal TV receiver 10, as such a compact unit, along with him or her, or in a carrying case for instance.

Although in the aforementioned embodiment the base plate 21 of the monitor mounting fixture 20 has been explained as being attached to the lower surface of the image pickup machine A, it may be attached to the top surface or side surface of the image pickup machine A. The attachment of the base plate 21 to the image pickup machine A and that of the TV receiver to the monitor support arm 27 can be also achieved by, for example, threaded members. Although in the aforementioned embodiment the shaft member 26 supporting the monitor support arm 27 has been explained as being movable along the axial direction, it may be of such a type that it cannot be moved in the axial direction. The base plate 21 may be mounted such that it cannot be moved relative to the image pickup machine A.

Although in the aforementioned embodiment the liquid crystal TV receiver 10 has been explained as being a monitor display, it may be a CRT-equipped compact TV receiver or a dedicated monitor display having no receiver function.

What is claimed is:

1. A monitor mounting fixture for mounting a monitor display on a video camera, the video camera having a length from the front to the back thereof, the monitor mounting fixture comprising:

base member means detachably mounted on the video camera;

monitor support arm means having one end portion which is supported by said base member means and which extends in a direction substantially perpendicular to the lengthwise direction of the video camera:

monitor mounting unit means, having a monitor engaging means, mounted on another end portion of said monitor support arm means for detachably mounting a monitor display thereon; and said base member means having a slide shoe engaging member detachably engageable with said video camera at an attaching site where it is attached to said video camera.

2. The monitor mounting fixture according to claim 1, in which said slide shoe engaging member is movably mounted on said base member means so as to movable relative to said base member means.

3. The monitor mounting fixture according to claim 1 wherein:

said monitor support arm means having one end portion which is supported by said base member means so as to be rotatable in a peripheral direction thereof; and said monitor support arm means including a grip which is not movable relative to said monitor display, said grip being below said monitor mounting unit means.

4. The monitor mounting according to claim 1, wherein:

said monitor support arm means having one end portion which is supported by said base member means so as to be rotatable in a peripheral direction thereof; and said monitor engaging means of said monitor mounting unit means comprises a slidable shoe engaging plate for engaging said slide shoe engaging member of said base member means for detachably mounting said monitor display thereon.

5. The monitor mounting fixture according to claim 1 wherein:

said monitor support arm means is supported by said base member means so as to be rotatable in a peripheral direction thereof: and said monitor engaging means of said monitor mounting unit means comprises a male threaded screw member having a knob thereon.

6. A video camera apparatus for mounting a monitor device on the video camera, the video camera having a length from the front to the back thereof, the apparatus comprising:

a video camera;

a base member detachably mounted on the video camera;

a monitor support arm having one end portion which is supported by said base member and which extends in a direction substantially perpendicular to the lengthwise direction of the video camera;

a monitor mounting unit means, having a monitor engaging means, mounted on another end portion of the monitor support arm for detachably mounting a monitor display thereon;

a monitor display mounted on said monitor engaging means of said monitor mounting unit means so as to be movable relative to said video camera; and said base member having a slide shoe engaging member detachably engageable with said video camera at an attaching site where said base member is attached to said video camera.

7. The video camera apparatus according to claim 6, in which said slide shoe engaging member is movably mounted so as to be movable relative to the base member.

8. The monitor video camera apparatus according to claim 6, wherein:

said monitor support arm means is supported by said base member such that it is movable in a axial direction; and said monitor support arm including a grip which is not movable relative to said monitor display, said grip being below said monitor mounting unit means.

9. The video camera apparatus according to claim 6, wherein:

said monitor support arm having one end which is supported on the base member such that it is movable in an axial direction; and said monitor engaging means of said monitor mounting unit means comprises a shoe engaging plate for engaging said slide shoe engaging member of said base member for detachably mounting said monitor display thereon.

10. The video camera apparatus according to claim 6, wherein:

a base member detachably mounted on the video camera;

said monitor support arm is supported on the base member such that it is movable in an axial direction; and said monitor engaging means of said monitor mounting unit means comprises a male threaded screw means having a knob for detachably mounting said monitor display thereon.

11. The video camera apparatus according to claim 6, wherein said one end portion of said monitor support arm, which is supported by said base member, is supported so as to be rotatable in a peripheral direction thereof.

12. A monitor mounting fixture for mounting a monitor on an image pickup machine, comprising:

base member means detachably mounted on the image pickup machine;

monitor support arm means having opposite end portions, one of said end portions being supported by said base member means so as to be rotatable in its peripheral direction, and said monitor support arm means having a telescopic structure to allow it to be extended or retracted relative to said base member means; and monitor mounting unit means mounted on the other of said end portions of said monitor support arm means for detachably mounting of a monitor display thereon.

13. The monitor mounting fixture according to claim 12, in which said monitor support arm means comprises a shaft supporting section which is bendable in an axial direction.

14. The video camera apparatus according to claim 12, in which said monitor display comprises a liquid crystal monitor display.

15. The monitor mounting fixture according to claim 12, in which said base member means has a connection screw means for detachable connection with said video camera at an attaching site to allow it to be fixed on said video camera.

16. The monitor mounting fixture according to claim 15, in which said connection screw means is movably mounted relative to said base member means.

17. A video camera apparatus for mounting of a monitor device thereon, comprising:
   a video camera having a view finder;
   a base member detachably mounted on said video camera;
   a monitor support arm having opposite ends, one of said ends being supported on said base member such that it is rotatable relative to said base member in a circumferential direction, and said monitor support arm having a telescopic structure for allowing an extension or retraction thereof relative to said base member;
   a monitor mounting unit mounted on the other of said ends of said monitor support arm for receiving a monitor display to be detachably mounted thereon; and
   a monitor display mounted on said monitor mounting unit.

18. The video camera apparatus according to claim 17, in which said monitor support arm comprises a shaft support portion which is bendable along an axial direction.

19. The video camera apparatus according to claim 17, in which said base member comprises an attaching screw located at an attaching site where said video camera is mounted.

20. The video camera apparatus according to claim 17, in which said monitor display comprises a television receiver.

21. A video camera apparatus having a view finder, and to which a monitor is detachably mounted, comprising:
   a video camera including a female thread portion on a bottom portion thereof, said video camera having said view finder thereon;
   a base member connected to the female thread portion of said video camera by a first male screw member;
   a monitor mounting unit mounted on said base member such that said monitor mounting unit is pivotable on a portion of said base member;
   a second male screw member having a knob; and
   a liquid crystal monitor display, including a female thread portion on a bottom portion thereof, said liquid crystal monitor display being detachably mounted on said monitor mounting unit by said second male screw member having said knob.

22. A monitor mounting fixture for mounting a monitor display on a video camera, the video camera having a length from the front to the back thereof, the monitor mounting fixture comprising:
   base member means detachably mounted on the video camera;
   monitor support arm means having opposite end portions, one of which is supported by said base member means such that said monitor support arm means extends in a direction substantially perpendicular to the lengthwise direction of the video camera; and
   monitor mounting unit means, mounted on the other of said end portions of said monitor support arm means, and comprising monitor engaging means which includes a male threaded screw member with a knob, said screw member detachably engaging the monitor display.

23. A monitor mounting fixture for mounting a monitor display on a video camera, the video camera having a length from the front to the back thereof, the monitor mounting fixture comprising:
   a base member means detachably mounted on the video camera;
   monitor support arm means having opposite end portions, one of which is supported by said base member means such that said monitor support arm means extends in a direction substantially perpendicular to the lengthwise direction of the video camera;
   a handle, mounted on the other of said end portions of said monitor support arm means, and being immovable relative to the monitor display; and
   monitor mounting unit means, provided on said handle and comprising monitor engaging means detachably attached to the monitor display.

24. A video camera apparatus with a monitor device mounted thereon, the video camera having a length from the front to the back thereof, the apparatus comprising:
   a video camera comprising a view finder;
   a base member means detachably mounted on said video camera;
   monitor support arm means having opposite end portions, one of which is supported by said base member means such that said monitor support arm means extends in a direction substantially perpendicular to the lengthwise direction of the video camera;
   monitor mounting unit means, mounted on the other of said end portions of said monitor support arm means, and including a male threaded screw member with a knob; and
   a monitor display detachably mounted on said monitor mounting unit means via said male threaded screw member.

25. A video camera apparatus with a monitor device mounted thereon, the video camera having a length from the front to the back thereof, the apparatus comprising:
   a video camera comprising a view finder;
   a base member detachably mounted on said video camera;
   a monitor support arm having opposite end portions, one of which is supported by said base member such that said monitor support arm extends in a direction substantially perpendicular to the lengthwise direction of the video camera;
   a handle mounted on the other of said end portions of said monitor support arm;
   monitor mounting unit means, provided on said handle, and comprising monitor engaging means; and
   a monitor display detachably mounted on said monitor mounting unit via said monitor engaging means;
   said handle being immovable relative to said monitor display.

26. A video camera apparatus mounting a monitor device thereon, comprising:
   a video camera;
   a base member detachably mounted on the video camera;
   a monitor support arm having one end portion which is supported on the base member such that it is movable in an axial direction;
   a monitor mounting unit means, having a monitor engaging means, mounted on another end of the monitor support arm means for detachably mounting a monitor display thereon;

a monitor display mounted on said monitor engaging means of said monitor mounting unit means so as to be movable relative to said video camera; and said base member comprises an attaching screw which is attached relative to said video camera such that it is movable relative to said base member at an attaching site of said video camera.

27. A monitor mounting fixture for mounting a monitor display on a video camera, comprising:

base member means detachably mounted on the video camera;

monitor support arm means having one end portion which is supported by said base member means so as to be rotatable in a peripheral direction thereof; and monitor mounting unit means, having a monitor engaging means, mounted on another end portion of said monitor support arm means for detachably mounting a monitor display thereon;

said base member means having a slide shoe engaging member detachably engageable with said video camera at an attaching site where it is attached to said video camera; and said slide shoe engaging member being movably mounted on said base member means so as to be movable relative to said base member means.

28. A monitor mounting fixture for mounting a monitor display on a video camera, comprising:

base member means detachably mounted on the video camera;

monitor support arm means having one end portion which is supported by said base member means so as to be rotatable in a peripheral direction thereof; and monitor mounting unit means, having a monitor engaging means, mounted on another end portion of said monitor support arm means for detachably mounting a monitor display thereon;

said base member means having a slide shoe engaging member detachably engageable with said video camera at an attaching site where it is attached to said video camera; and said slide shoe engaging member being movably mounted so as to be movable relative to the base member.

* * * * *